United States Patent
Shih

(10) Patent No.: US 8,689,635 B2
(45) Date of Patent: Apr. 8, 2014

(54) AUTOMATIC CALIBRATION PROCEDURE OF TEMPERATURE COMPENSATION FOR DIGITAL PRESSURE GAUGES

(75) Inventor: Li-Jen Shih, Kaohsiung (TW)

(73) Assignee: Taiwan Silicon Microelectronics Co., Ltd., Kaohsiung (TW)

( * ) Notice: Subject to any disclaimer, the term of this patent is extended or adjusted under 35 U.S.C. 154(b) by 177 days.

(21) Appl. No.: 13/310,946

(22) Filed: Dec. 5, 2011

(65) Prior Publication Data

US 2012/0285253 A1 Nov. 15, 2012

Related U.S. Application Data

(63) Continuation-in-part of application No. 13/107,220, filed on May 13, 2011.

(51) Int. Cl.
  *G01L 19/04* (2006.01)
(52) U.S. Cl.
  USPC .......................................................... 73/708
(58) Field of Classification Search
  USPC .................................................. 73/700–756
  See application file for complete search history.

(56) References Cited

U.S. PATENT DOCUMENTS

| | | | | |
|---|---|---|---|---|
| 4,607,530 A | * | 8/1986 | Chow | 73/708 |
| 4,612,811 A | * | 9/1986 | Sarasohn | 73/706 |
| 4,682,501 A | * | 7/1987 | Walker | 73/708 |
| 4,866,640 A | * | 9/1989 | Morrison Jr. | 702/98 |
| 5,307,683 A | * | 5/1994 | Phelps et al. | 73/708 |
| 2007/0186657 A1 | * | 8/2007 | Sato et al. | 73/708 |

* cited by examiner

*Primary Examiner* — Andre Allen
(74) *Attorney, Agent, or Firm* — Rosenberg, Klein & Lee

(57) ABSTRACT

An automatic operation method for setting temperature compensation coefficients of a digital pressure gauge is revealed. Primarily, a microcontroller unit (MCU) in the pressure gauge is equipped with built-in calibration procedures. The gauge is placed into a temperature-controlled chamber in order to obtain the temperature coefficient of offset (Tco) and temperature coefficient of span (Tcs). This method is the automatic measuring outputs of zero pressure/full scale at two temperatures to calculate the temperature coefficients Tco/Tcs. The two temperature compensation coefficients are stored in the MCU inside the pressure gauge. As the pressure gauge operates in any working temperature environments, the gauge based on a certain algorithm formula with the two stored temperature coefficients shows an accurate pressure reading.

3 Claims, 2 Drawing Sheets

AUTOMATIC CALIBRATION PROCEDURE OF TEMPERATURE COMPENSATION FOR DIGITAL PRESSURE GAUGES

REFERENCE TO RELATED APPLICATION

This Patent Application is being filed as a Continuation-in-Part of patent application Ser. No. 13/107,220, filed 13 May 2011, currently pending.

BACKGROUND OF THE INVENTION

1. Field of the Invention

The present invention relates to an automatic operation method for setting temperature coefficients of digital pressure gauges, specifically to an automatic operation method that increases the efficiency of obtaining pressure gauge temperature coefficients, so as to save time consumed by setting temperature compensation of pressure gauges, reduce costs of both equipment and operation and improve the practical effects of the device.

2. Description of Related Art

The pressure gauge which holds temperature compensated feature, can effectively correct the influence of temperature on a pressure measurement. As a result, more accurate measurement is provided.

For temperature compensation, a temperature-controlled chamber is provided and several pressure gauges are set inside the chamber. A computer connects to each pressure gauge by communication interfaces for controlling the temperature-controlled chamber and changing the temperature. The temperature of the temperature-controlled chamber is increased or decreased to a certain value and the pressure value measured by each pressure gauge changes as the temperature change. Then the computer stores temperature compensation coefficients obtained from each pressure gauge into the memory of the pressure gauge through the communication interfaces. Thus the pressure gauge has the feature of temperature compensation so as to reduce the influence of temperature on the measured pressure value during measurement.

However, the operation of above temperature compensation approach is quite inconvenient in practice. The connection between the computer and respective pressure gauge, as well as the arrangement of each pressure gauge in the temperature-controlled chamber is troublesome and time-consuming. Thus the cost is increased. There is still a space for improvement.

SUMMARY OF THE INVENTION

Therefore, it is a primary objective of the present invention to provide an automatic operation method for setting temperature coefficients of digital pressure gauges by which the setting of the temperature compensation for pressure gauges is more simple and convenient. The time consumed by the setting of the temperature compensation for pressure gauges is effectively reduced. Thus the practical effects of the device are improved.

In order to achieve the above objective, a micro-controller unit (MCU) inside the pressure gauge is programmed with built-in calibration procedures. The pressure gauges are set into a chamber in which the temperature and pressure are programmable. Thus a temperature coefficient of offset of the pressure gauge without being pressured $T_{CO}$, and a temperature coefficient of span of the pressure gauge at full pressure $T_{CS}$ are calculated and obtained by built-in calibration procedures in the MCU of the pressure gauge. Moreover, temperature compensation coefficients such as the temperature coefficients $T_{CO}$, $T_{CS}$, a temperature value $T_i 1$ of the pressure gauge measured at the temperature 1, a pressure value $P_{so}1$ of the pressure gauge measured at the temperature 1, and a pressure difference Span1 of the pressure gauge at the temperature 1 are all stored into the memory of the pressure gauge.

BRIEF DESCRIPTION OF THE DRAWINGS

The structure and the technical means adopted by the present invention to achieve the above objectives can be best understood by referring to following detailed descriptions of the preferred embodiments and the accompanying drawings, wherein.

DETAILED DESCRIPTION OF THE PREFERRED EMBODIMENT

Figure 1:
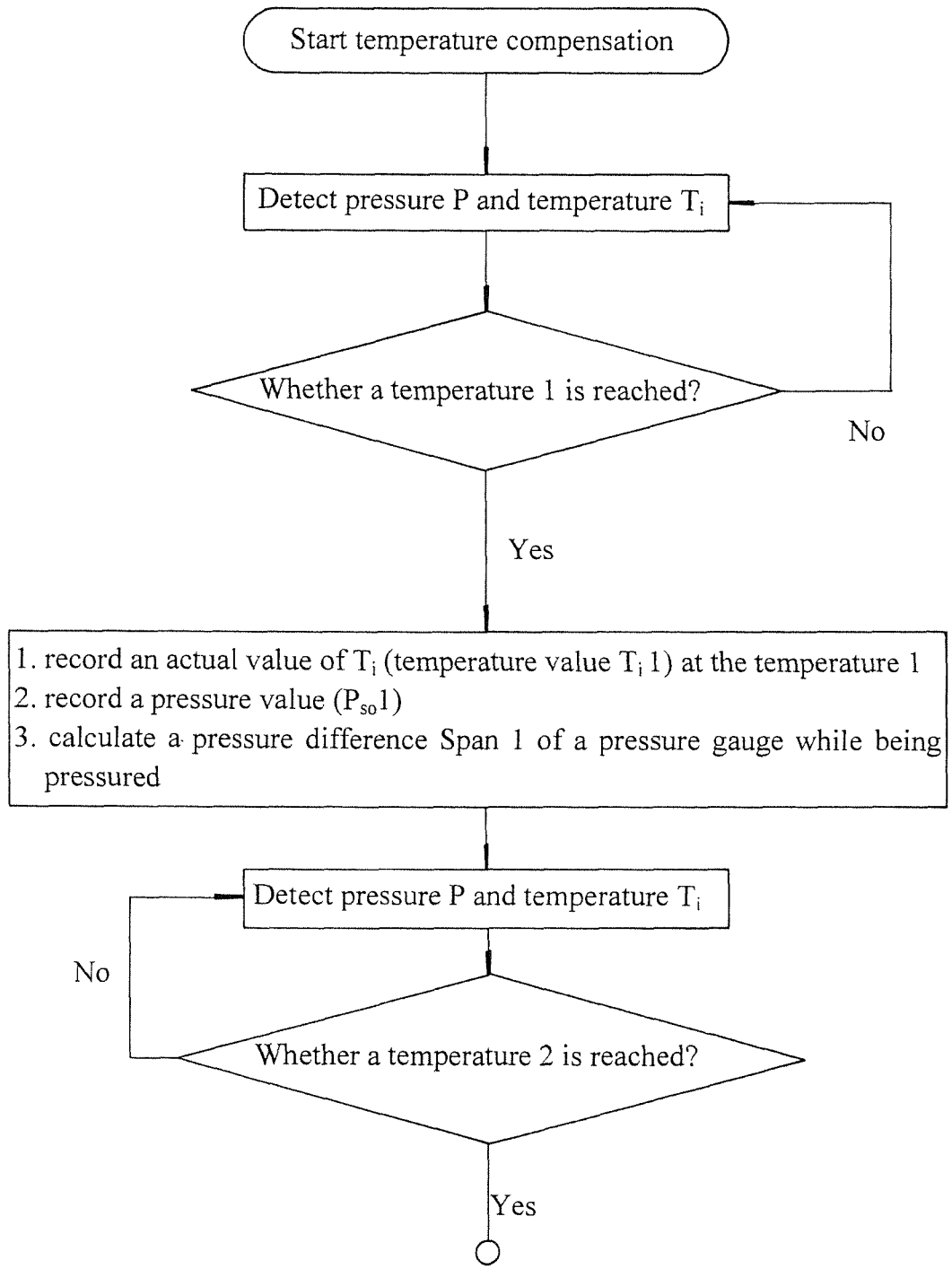
FIG. 1-1 and FIG. 1-2 are first flow charts of an embodiment according to the present invention.
Figures 1, 2:
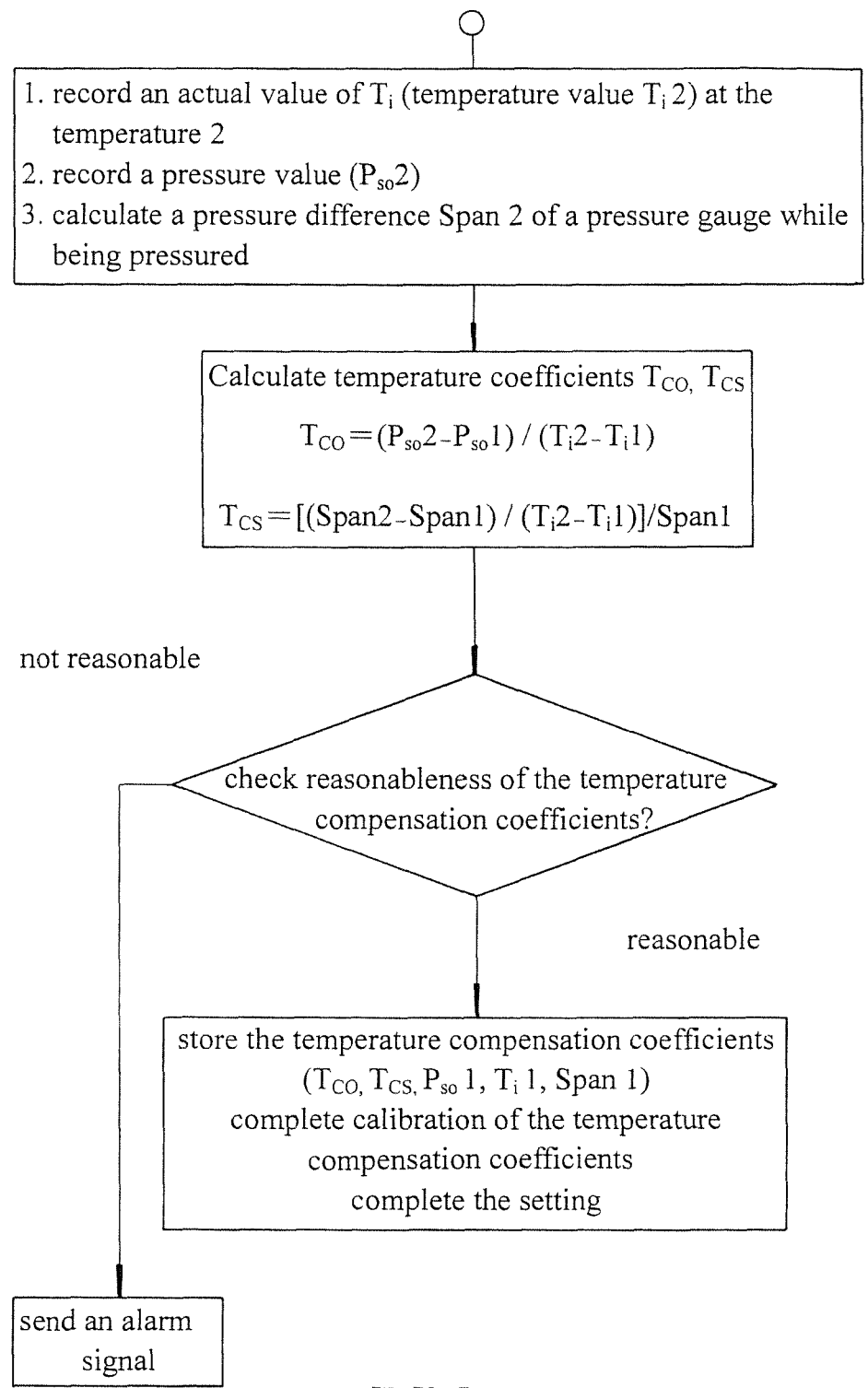

Referring from FIG. 1-1 to FIG. 1-2, flow charts of the present invention are revealed. In an embodiment of the present invention, the calibration procedure is set up in a micro-controller unit (MCU) of a pressure gauge. The pressure gauges are set into a chamber in which the temperature and pressure are controllable. By the calibration procedure built in the MCU of the pressure gauge, a temperature coefficient of offset of the pressure gauge without being pressured $T_{CO}$, and a temperature coefficient of span of the pressure gauge at full pressure $T_{CS}$ are calculated and obtained. Moreover, temperature compensation coefficients such as the temperature coefficients $T_{CO}$, $T_{CS}$, the temperature value $T_i 1$ of the pressure gauge measured at the temperature 1, the pressure $P_{so}1$ value of the pressure gauge measured at the temperature 1 and zero gauge pressure, and the pressure difference Span1 of the pressure gauge at the temperature 1 and full scale pressure are all stored into the memory of the pressure gauge. Using those temperature compensation coefficients, the actual pressure by temperature compensation can be achieved by the following formula (1). Further speaking, after the pressure gauge mounted into a chamber in which the temperature and pressure are controllable, the temperature coefficients $T_{CO}$, $T_{CS}$ built in the pressure gauge, an output signal Ps from the pressure gauge, and an output signal Ti from a temperature gauge can be read. A pressure value P is obtained according to the following formula (1).

$$P=FS/Span1[1+(T_i-T_i1) \times T_{CS}] \times [P_S-P_{so}1+(T_i-T_i1) \times T_{CO}] \quad (1)$$

FS: Full scale pressure
Ps: Measured pressure
P: Actual pressure by temperature compensation.

An embodiment of the method of the present invention includes the following steps:

1. Mounting the pressure gauges with an MCU, programmed with a built-in calibration procedure, into a chamber in which the temperature and pressure are controllable.
2. Executing the temperature compensation calibration procedure and detect whether temperature 1 is reached.
3. Recording an actual temperature value $T_i$ 1 and a pressure value $P_{so}$ 1 of the pressure gauges when temperature 1 is reached, and then calculate a pressure difference Span1 while being pressured. If the temperature 1 is not reached, return and detect the $T_i$ 1 and $P_{so}$ 1.

4. Changing the temperature of the chamber and detect whether the pressure gauge reaches temperature 2 after the temperature change of the chamber.
5. Record an actual temperature value $T_i2$ and a pressure value $P_{so}2$ of the pressure gauge when the temperature 2 is reached, and then calculate a pressure difference Span2 while being pressured. If the temperature 2 is not reached, return and detect the $T_i2$ and $P_{so}2$.
6. Using formula (2) to calculate the temperature coefficient of offset of the pressure gauge, $T_{CO}$, $$T_{CO}=(P_{so}2-P_{so}1)/(T_i2-T_i1) \quad (2)$$

Using formula (3) to calculate the temperature coefficient of span of the pressure gauge $T_{CS}$ $$T_{CS}[(Span2-Span1)/(T_i2-T_i1)]/Span1 \quad (3)$$

7. Checking whether the temperature compensation coefficients are reasonable. Sending an alarm signal when the temperature compensation coefficients are not reasonable or storing the temperature compensation coefficients into the memory of the pressure gauge if the temperature coefficients are reasonable. Completing the procedure.

In addition, during the setting of the temperature compensation for the pressure gauge, the MCU measures the room temperature as the first temperature $T_i 1$ during the automatic calibration of the pressure gauge. When the temperature reaches the temperature 2, the actual temperature value $T_i 2$ recorded is another temperature difference from the room temperature. For temperature calibration of the pressure gauge, a room temperature value $T_i 1$ is measured and obtained immediately. After the temperature of the chamber is increased, another temperature value $T_i 2$ different from the room temperature in the chamber is also measured and obtained quickly. The operation is fast and energy-saving. Thus the temperature compensation calibration procedure of the pressure gauge is completed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An automatic operation method for obtaining temperature compensation coefficients of digital pressure gauges comprising the steps of:
    A: mounting the pressure gauges with a micro-controller unit (MCU), programmed with a built-in calibration procedure, into a chamber in which the temperature and pressure are controllable;
    B: executing the temperature compensation calibration procedure and detecting whether temperature 1 is reached;
    C: recording an actual temperature value $T_i 1$ and a pressure value $P_{so} 1$ of the pressure gauges when temperature 1 is reached, and then calculating a pressure difference Span1 while being pressured;
    D: changing the temperature of the chamber and detecting whether the pressure gauge reaches temperature 2 after the temperature change of the chamber;
    E: when temperature 2 is reached, recording an actual temperature value $T_i 2$ and a pressure value $P_{so} 2$ of the pressure gauge, and then calculating a pressure difference Span2 while being pressured;
    F: calculating the temperature coefficients of the pressure gauge $T_{CO}$ and $T_{CS}$;
    G: alternatively sending an alarm signal or storing the temperature compensation coefficients into a memory of the pressure gauges based on the calculated values thereof.

2. The method as claimed in claim 1, wherein each of temperature compensation coefficients is calculated and obtained by the calibration procedure.

3. The method as claimed in claim 1, wherein in the step of storing the reasonable temperature compensation coefficients into the memory of the pressure gauges, the temperature compensation coefficients include a temperature coefficient of offset of the pressure gauge without being pressured $T_{CO}$, a temperature coefficient of span of the pressure gauge at full pressure $T_{CS}$, the actual temperature value $T_i 1$, the pressure value $P_{so} 1$ of the pressure gauge at temperature 1 and the pressure difference Span1.

* * * * *